United States Patent [19]

Ikeuchi et al.

[11] Patent Number: 4,968,106
[45] Date of Patent: Nov. 6, 1990

[54] HIGH VOLTAGE GENERATING APPARATUS FOR TELEVISION EQUIPMENT

[75] Inventors: Hiroshi Ikeuchi, Yokosuka; Nobuaki Imamura, Yokohama, both of Japan

[73] Assignee: Murata Manufacturing Co., Ltd., Nagaokakyo, Japan

[21] Appl. No.: 279,173

[22] Filed: Dec. 2, 1988

[30] Foreign Application Priority Data

| Dec. 4, 1987 | [JP] | Japan | 62-307129 |
| Jan. 29, 1988 | [JP] | Japan | 63-19140 |
| Mar. 24, 1988 | [JP] | Japan | 63-70782 |
| May 27, 1988 | [JP] | Japan | 63-129618 |
| May 30, 1988 | [JP] | Japan | 63-131934 |

[51] Int. Cl.$^5$ ............................................. H01J 29/70
[52] U.S. Cl. ............................................. 315/411; 358/190; 363/21
[58] Field of Search ............. 315/411; 358/190, 243; 363/21

[56] References Cited

U.S. PATENT DOCUMENTS

4,559,591 12/1985 Grunsch ........................... 363/21

Primary Examiner—Theodore M. Blum
Attorney, Agent, or Firm—Armstrong, Nikaido, Marmelstein, Kubovcik & Murray

[57] ABSTRACT

The high voltage generating apparatus includes a flyback transformer to be employed in television equipment and has a circuit for stabilizing a high voltage output. This circuit comprises an additive voltage generating coil, a reference voltage generating circuit, a voltage detector, a comparison amplifier, a switching circuit and a voltage multiplying rectifier circuit. The reference voltage generating circuit generates an inclined voltage in the flyback time of the horizontal deflection cycle and the voltage detector detects a mode of the high voltage output. The comparison amplifier compares an inclined voltage and a detection voltage and generates a control signal. The switching circuit operates with the control signal. With this operation, an additive voltage generated by the additive voltage generating coil is supplied to the high voltage coil of the flyback transformer through the voltage multiplying rectifier circuit. The voltage to be supplied compensates the voltage fall if the high voltage output and accordingly the high voltage output is stabilized.

18 Claims, 10 Drawing Sheets

FIG.14

HIGH VOLTAGE GENERATING APPARATUS FOR TELEVISION EQUIPMENT

BACKGROUND OF THE INVENTION

The present invention relates to a high voltage generating apparatus for supplying a high voltage to an anode of a cathode-ray tube, particularly a high voltage generating apparatus provided with a circuit for stabilizing a high voltage output.

Figure 1:
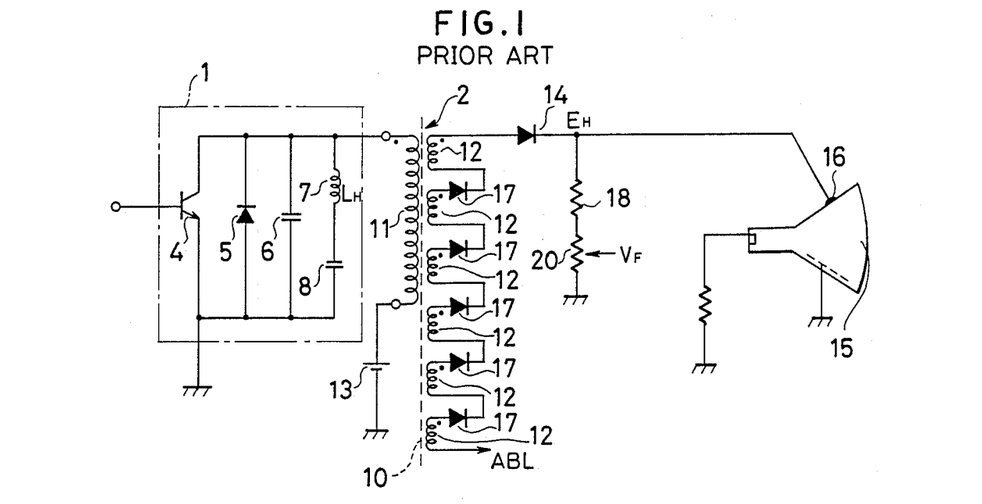
FIG. 1 is a circuit diagram of the conventional high voltage generating apparatus.

FIG. 1 shows a conventional high voltage generating circuit. This high voltage generating circuit is provided with a horizontal deflection output circuit 1 and a flyback transformer 2.

The horizontal deflection output circuit 1 comprises a horizontal output transistor 4, a damper diode, an oscillation capacitor 6, a horizontal deflection coil 7 and an S-shaped compensation capacitor. The horizontal output transistor 4 receives a voltage pulse transmitted from the horizontal drive circuit to perform switching and applies a sawtooth wave current to the horizontal deflection coil 7 in cooperation with the damper diode 5. On the other hand, the oscillation capacitor and the horizontal deflection coil 7 generates a flyback pulse with their oscillating action and supply it to the flyback transformer.

The flyback transformer 2 is made up with a low voltage coil 11 and a high voltage coil 12 mounted on the core 10 and one end of the low voltage coil 11 is connected to the collector of the horizontal output transistor 4 and the other end of said coil 11 is connected to the power supply 13. The high voltage side of the high voltage coil 12 is connected to the anode of the cathode-ray tube through the high voltage rectifying diode 14 and the other end of said coil 12 is connected to the ABL (Automatic Brightness Limiter). This flyback transformer 2 boosts the flyback pulse voltage supplied from the horizontal deflection output circuit 1 and supplies the boosted output (output voltage) to the anode 16 of the cathode-ray tube.

Figure 3:
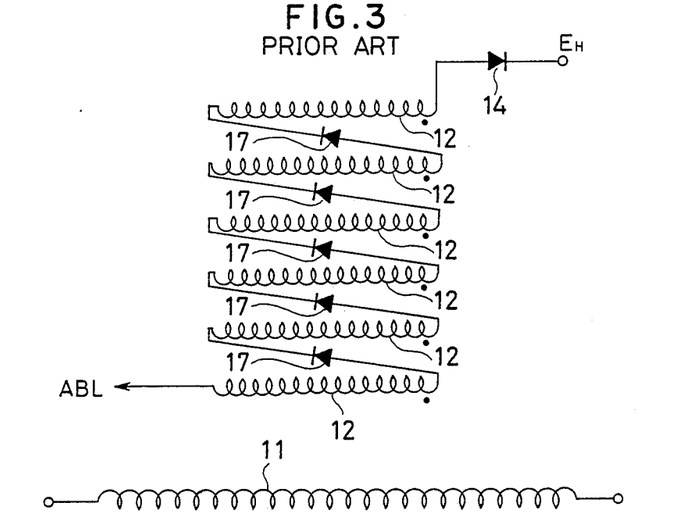
FIG. 3 is a connection diagram of the high voltage coil shown in FIG. 2.

Generally, as shown in FIGS. 1 and 3, the high voltage coil 12 is wound in multiple layers. If the coils of all layers are wound in the same count of turns, same winding width and same winding pitch and the end of the coil of each layer and the beginning of the coil of the next layer are connected with said diode 17 to have the same polarity, the potential difference is zero in terms of the alternating current between the coils of layers. Accordingly, the electric insulation between layers can be taken into consideration only as to the potential difference of the direct current and it is easy because heat generation due to dielectric loss need be taken into account.

Figure 2:
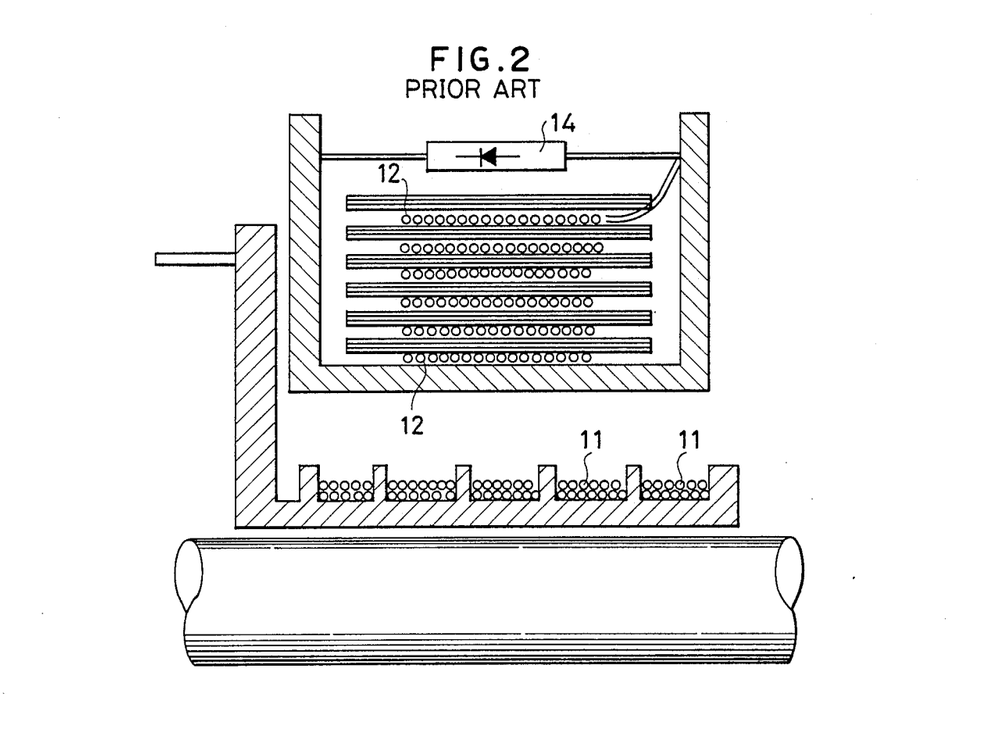
FIG. 2 is a view of the half section of the conventional flyback transformer in which a high voltage coil is wound in layers.

If the high voltage coil is wound in multiple layers, the distance between the low voltage coil 11 and the high voltage coil 12 can be smaller than that of other section coils wound on the bobbin and the finish outside diameter of the high voltage coil can be small. Consequently, said high voltage coil 12 is advantageous in that its leakage inductance can be small. For this reason, the flyback transformer 2 employing the high voltage coil wound in multiple layers is widely used.

Figure 4:
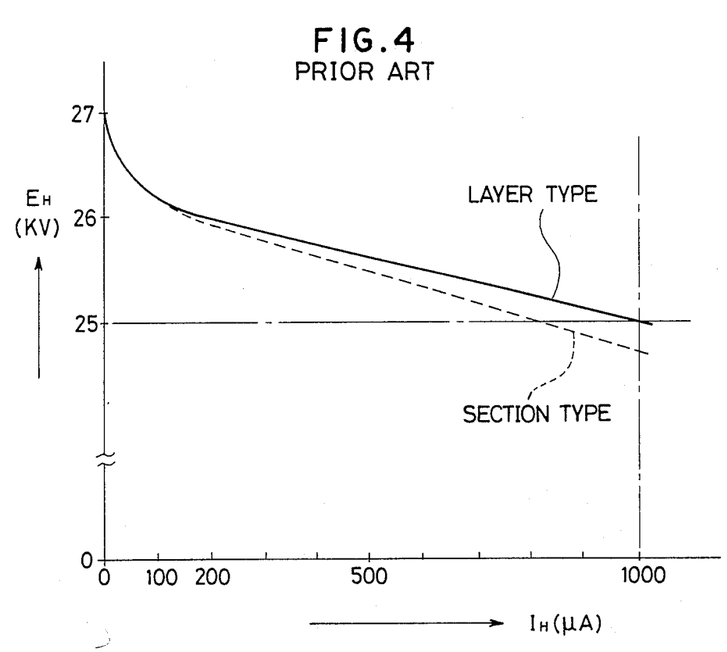
FIG. 4 is a characteristic diagram showing the relationship between the voltage and the current applied to the anode of cathode-ray tube.

However, in case the high voltage coil 12 is only wound in multiple layers, the output current $I_H$ flowing from said coil 12 to the anode 16 of the cathode-ray tube 15 as shown in FIG. 4 suddenly reduces in the range of 0 to 200 $\mu A$ and this phenomenon is unfavorable. In recent years, a fixed resistor 18 and a variable resistor 20 are arranged in series connection between the high voltage output side (the anode side of the cathode-ray tube) and the grounding side to divide a current as much as approximately 10% of output current $I_H$ as shown in FIG. 1 and sudden reduction of said output current is prevented as shown in FIG. 5.

Figure 5:
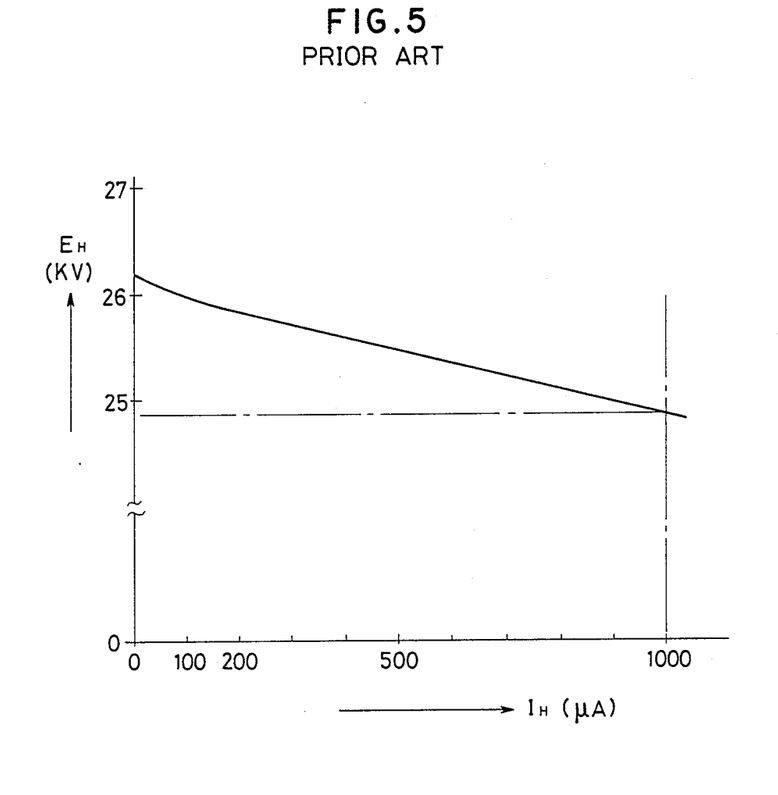
FIG. 5 is a characteristic diagram showing the relationship between the output voltage and the current of the high voltage generating apparatus provided with a means for shunting the output current as shown in FIG. 1.

In other words, as shown in FIGS. 4 and 5, if the tolerance range of reduction of current $I_H$ is set to 0 to 1000$\mu A$, th eoutput impedance $Z_{01}=(27-25)$ kV/1000$\mu A=2M\Omega$ as known from FIG 4. as far as the means for shunting current $I_H$ is not provided, whereas the output impedance $Z_{02}$ is $Z_{02}=(26.1-24.9)kv/1000\mu A=1.2M\Omega$ as known from FIG. 5 as far as the means for shunting current $I_H$ is provided, thus the output impedance has been substantially improved.

Recently, however, the demands have been more and more emphasized for improvement of the definition and precision of the cathode-ray tue 15 and further reduction of the output impedance. Moreover, the means which does not incur power loss in such reduction of the output impedance is strongly demanded but a method for shunting current $I_H$ through the fixed resistor 18 and the variable resistor 20 as described above has been unable to meet these demands and has not been accepted by the market.

SUMMARY OF THE INVENTION

An object of the present invention is to provide a high voltage generating apparatus provided with a circuit for stabilizing the output voltage from the flyback transformer.

Another object of the present invention is to provide a high voltage generating apparatus for stabilizing an output voltage by supplying a voltage from an additive voltage generating coil which compensates a fall of the output voltage from the high voltage coil of the flyback transformer due to a variation of load.

Another further object of the present invention is to provide a high voltage generating apparatus adapted to actuate a switching circuit in the flyback time of the horizontal deflection current, thus eliminating the effect of switching noise to rasters.

The high voltage generating apparatus in accordance with the present invention comprises a flyback transformer, a reference voltage generating circuit, a voltage detection circuit, an additive voltage generating coil, a switching circuit, a comparison amplifier and a voltage multiplying rectifier circuit. The flyback transformer comprises a low voltage coil and a high voltage coil, and a current supplied from the horizontal deflection output circuit is supplied to the low voltage coil and a flyback pulse voltage generated by the high voltage coil is rectified by the rectifying circuit and supplied to the anode of the cathode-ray tube.

The reference voltage generating circuit comprises a square wave output circuit and an integration circuit and a square wave signal is generated from the square wave output circuit in accordance with the control voltage generated from the control voltage generating coil and this signal is integrated by the integration circuit to generate an inclined voltage in the flyback time of the horizontal deflection cycle.

A high voltage supplied to the anode of the cathode-ray tube is detected by the voltage detection circuit and supplied with the inclined voltage to the comparison amplifier. This amplifier outputs a control pulse signal which has a pulse width equal to a period during which the inclined voltage is larger than the detection voltage.

The switching circuit is connected between the additive voltage generating coil which is mounted on the core of the flyback transformer to generate an additive voltage and the voltage multiplying rectifier circuit and supplies the additive voltage to the high voltage coil through the voltage multiplying rectifier circuit when the control transistor included in the switching circuit is on. The control transistor is actuated by an operation of the drive transistor, which operates with a control signal.

The duration time of the control signal becomes long when the voltage supplied to the anode of cathode-ray tube falls due to a variation of the load and the additive voltage generated when the ON time of the control transistor is extended is supplied to the high voltage coil to stabilize the output voltage. The magnitude of additive voltage and the number of boosting steps of the voltage multiplying rectifier circuit are determined taking into account of magnitude of expected variation of the load and a reverse withstand voltage characteristic of the control transistor. Preferably, a switching control circuit which controls the operation time of the switching circuit is provided. This current allows the limiting of the operation of the switching circuit to the flyback time of the horizontal deflection cycle and prevent intrusion of switching noise into the flyback time.

Further preferably, a discharging circuit for discharging an electric charge in the capacitor of the voltage multiplying rectifier circuit is provided to prevent an excessive voltage from being applied to the control transistor when the load largely varies.

DETAILED DESCRIPTION OF PREFERRED EMBODIMENTS

Figure 6:
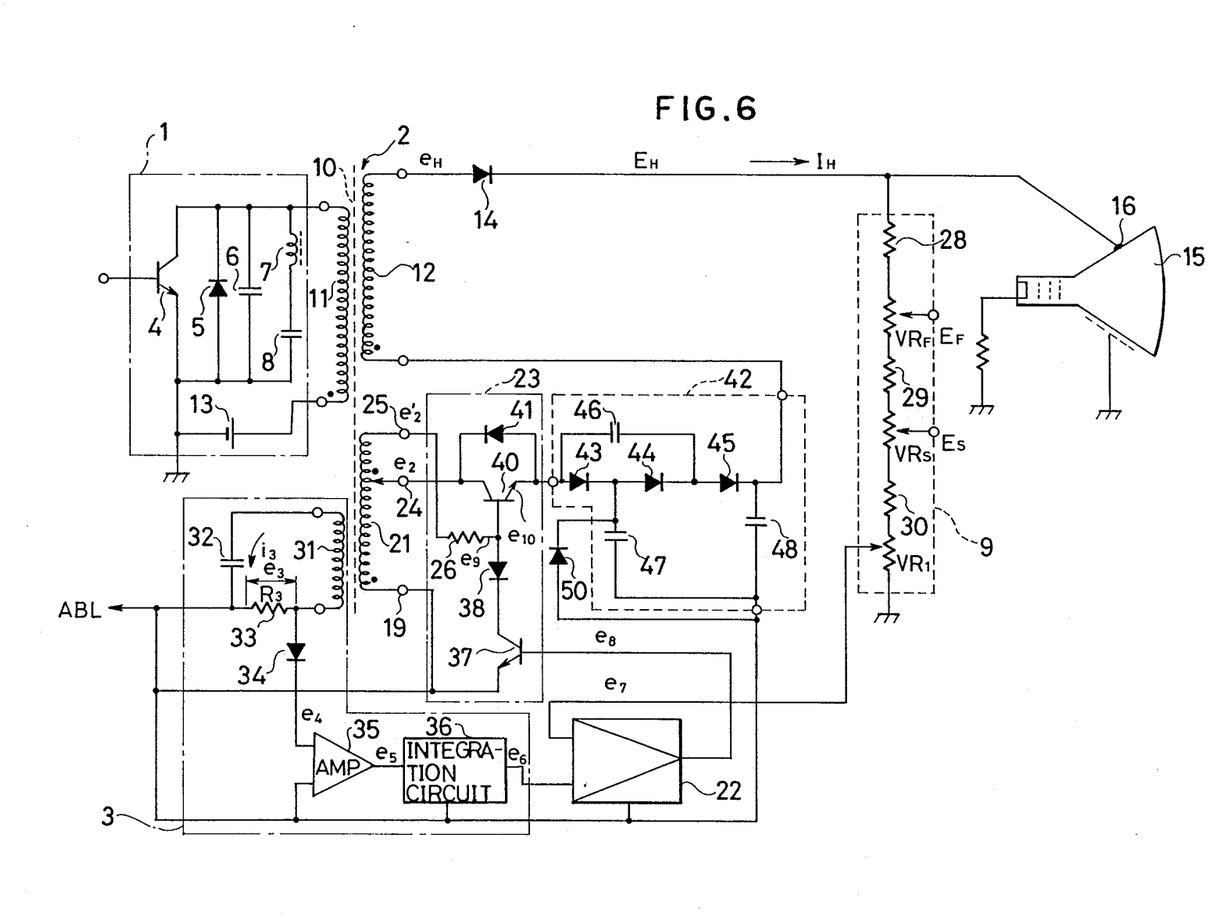
FIG. 6 is a circuit diagram showing a preferred embodiment of the high voltage generating apparatus in accordance with the present invention.

FIG. 6 is a circuit diagram showing a preferred embodiment of the present invention. The same circuit parts as those in FIG. 1 are given the same symbols to avoid duplicated descriptions.

A characteristic point of this embodiment differing from the example shown in FIG. 1 is that a reference voltage generating circuit 3, a voltage detector 9, an additive voltage generating coil 21, a comparison amplifier 22 and a switching circuit 23 are provided.

Said additive voltage generating coil 21 is mounted on the core 10 of the flyback transformer 2 while being insulated from other coils. An input tap 19 is provided at the beginning part of the coil 21, and the first output tap 24 and the second output tap 25 are provided at the end part (winding end side) of said coil 21. The first output tap 24 outputs an additive voltage generated by said coil 21. The second output tap 25 is provided at a position where the coil is wound as many times as the specified count of turns from the position of the first output tap 24. The amount of winding of this second output tap 25 is set to the count of turns of winding for compensating the voltage drop due to the resistor 26 to be connected to said second tap 25, that is, the count of turns for generating the voltage corresponding to the voltage drop of the resistor 26.

On the other hand, an end of the fixed resistor 28 is connected to the high potential side of the high voltage coil 12 (the cathode of the high voltage rectifying diode 14) and the other end of said resistor 28 is series-connected to the variable resistor $VR_F$, fixed resistor 29, variable resistor $VR_S$, fixed resistor 30 and variable resistor $VR_1$ in order to form the voltage detector 9 for the output voltage $E_H$. The other end of the variable resistor $VR_1$ is connected to the reference potential line (the ground in the diagram).

Said variable resistor $VR_1$ detects the output voltage $E_H$ and this detected voltage $e_7$ is applied to the first input terminal of the comparison amplifier 22.

Said reference voltage generating circuit 3 comprises the control voltage generating coil 31, rectifier 34, square wave output circuit 35 and integration circuit 36.

Figure 7:
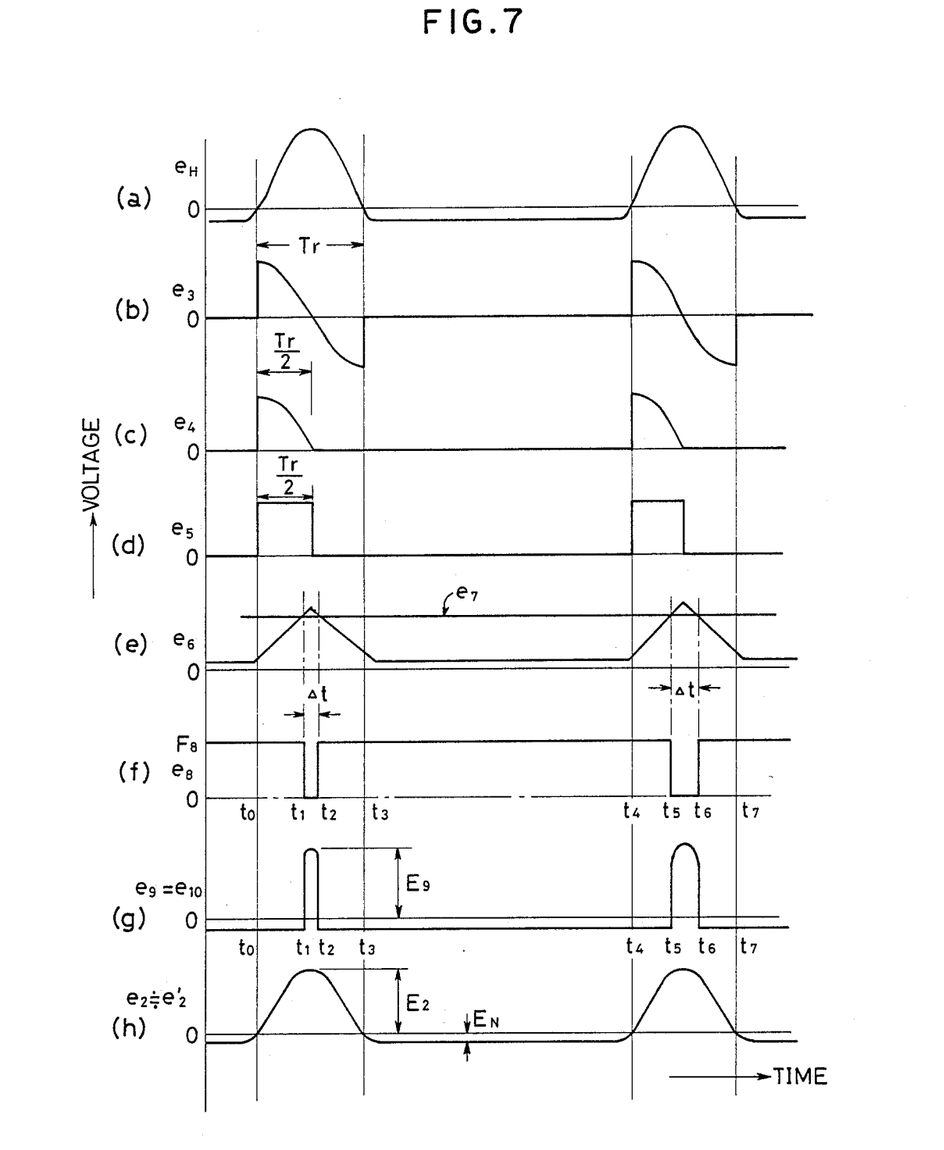
FIG. 7 is a waveform diagram of various parts of the circuit diagram shown in FIG. 6, FIGS. 8 to 10 are respectively an explanatory diagram explaining the operation of the voltage multiplying rectifier circuit.

The control voltage generating coil 31 is mounted on the core 10 of the flyback transformer at the low voltage side while being insulated from other coils and generates a control current similar to the flyback pulse waveform shown in FIG. 7(a). An end of the oscillation capacitor 32 is connected to the high potential side (winding end side) of this control voltage generating coil 31 and the low potential side (winding start side) of said coil 31 is connected to the other end of the oscillation capacitor 32 through the resistor 33 to form the oscillation circuit. The connection of the oscillation capacitor 32 and the resistor 33 are connected to the ABL.

The oscillation circuit including the oscillation capacitor 32 oscillates with a control current generated by said control voltage generating coil 31 and generates a current waveform having a cycle approximately two times the flyback time Tr. The voltage $e_3$ across the resistor 33 presents the oscillation current produced from the oscillation circuit. The waveform (FIG. 7(b)) of this voltage $e_3$ is similar to the waveform of said oscillation current. This voltage $e_3$ is denoted as $e_3 = i_3 \times R_3$ if the oscillation current is $i_3$ and the resistance value of resistor 33 is $R_3$.

The anode of the rectifier 34 (diode in the diagram) is connected to the connections of said control voltage generating coil 33 and the resistor 31 and the cathode side of said rectifier 34 is connected to the first input terminal of the square wave output circuit 35. The second input terminal of the square wave output circuit 35 is connected to the ABL. Said rectifier 34 half-wave rectifies the waveform of voltage $e_3$ appearing across the resistor 33 to pick up a positive component of voltage $e_3$(FIG. 7($c$)) and adds this half-wave rectified voltage $e_4$ to the square wave output circuit 35. This square wave output circuit 35 generates a square wave voltage (for the purpose of the present specification, the square wave includes not only rectangular waveforms but also right square waveforms) for which the cycle as shown in FIG. 7($d$) is equal to $\frac{1}{2}$ of the flyback time from said half-wave rectified voltage. In this embodiment, this circuit 35 comprises a saturation type amplifier and saturatedly amplifies the half-wave rectified voltage to obtain the square wave voltage $e_5$ shown in FIG. 7($d$). This square wave can also be obtained by amplifying the half-wave rectified voltage $e_4$ through a common amplifier and clipping the heading of the amplified output waveform in the clipping circuit.

The square wave voltage $e_5$ output from the square wave output circuit 35 is supplied to the integration circuit 36. This integration circuit 36 integrates square wave voltage $e_5$ over the period from the beginning of flyback time Tr to $\frac{1}{2}$ of flyback time Tr and generates a waveform which has a peak at a position corresponding to $\frac{1}{2}$ of the flyback time and rises toward the right side as shown in FIG. 7($e$). In this case, the integration is not carried out for the time of $\frac{1}{2}$Tr to Tr and the waveform of the voltage is therefore declined toward the right side from the peak position due to discharging from the capacitor of the integration circuit, and the triangular wave voltage $e_6$ with the peak at the position of $\frac{1}{2}$Tr as a whole is generated in the flyback time Tr. This triangular waveform of the voltage maintains a fixed shape even in any flyback time Tr. This triangular wave voltage $e_6$ is supplied to the second input terminal of comparison amplifier 22.

The comparison amplifier 22 compares the triangular wave voltage $e_6$ and the detected voltage $e_7$ supplied from the variable resistor $V_{R1}$ of said voltage detector 9 (FIG. 7($e$)) and supplies the control signal $e_8$, which has a zero voltage only for the range $\Delta t$ where the triangular wave voltage $e_6$ exceeds the detected voltage $e_7$ (range $t_1 \sim t_2$ and $t_5 \sim t_6$ in the figure) and a positive level voltage in the other period including the scanning time, to the switching circuit 23.

The switching circuit 23 comprises a drive transistor 37, a diode 38, a resistor 26, a control transistor 40 and a diode 41. The drive transistor 37 is connected to the output terminal of the comparison amplifier 22 at its base, the common connection of the low potential side of the additive voltage generating coil 21, and the ABL at its emitter and the cathode of the diode 38 at its collector, respectively. The anode of the diode 38 is commonly connected to the base of the control transistor 40 and an end of the resistor 26, and the other end of the resistor 26 is connected to the second output tap 25 of the additive voltage generating coil 21 and the collector of the control transistor 40 is connected to the first output tap 24 of said coil 21. The emitter of transistor 40 is connected to the input side of the voltage multiplying rectifier circuit 42 (the voltage doubling circuit in the figure). The diode 41 is connected between the emitter and the collector of the control transistor with its cathode faced to the collector. This diode 41 is for admitting the reverse current from the emitter to the collector of transistor 40. Accordingly, if the transistor 40 is a transistor such as, for example, a bipolar transistor through which a reverse leaking current flows, the diode 41 is not always required and can be omitted. This switching circuit 23 supplies the pulse voltage $e_{10}$ as shown in FIG. 7($g$) to the voltage multiplying rectifier circuit 42 when the control signal $e_8$ has a zero voltage.

Said voltage multiplying rectifier circuit 42 comprises the first to third diodes 43, 44 and 45 and the first to third capacitors 46, 47 and 48. The anode of said first diode 43 is connected to the emitter of said second transistor 40, the cathode of said diode 43 is connected to the anode of the second diode 44 and the cathode of said diode 44 is connected to the anode of the third diode 45 to form the series-connected system of diodes. The cathode of this third diode 45 is connected to the low potential side of the high voltage coil 12.

An end of the first capacitor 46 is connected to the emitter of said transistor 40 and the other end of said capacitor 46 is connected to the connection of the cathode of the second diode 44 and the anode of the third diode 45. An end of the second capacitor 47 is connected to the connection of the cathode of the first diode 43 and the anode of the second diode 44 and an end of the third capacitor 48 is connected to the cathode of the third diode 45 and the other are connected to the ABL. The third capacitor 48 is not essential at all and can be omitted, depending on the case. The anode of diode 50 is connected to this ABL and the cathode of diode 50 is connected to the connection of the first diode 43 and the second diode 44. This cathode may be connected to the connection of the second diode 44 and the third diode 45. The following describes the stabilizing operation of the output voltage $E_H$ as described in the above embodiment.

When the high voltage current $I_H$ flows in the anode of the cathode-ray tube, the output voltage $E_H$ falls and the voltage $e_7$ detected by the voltage detector 20 also accordingly falls. If this detection voltage $e_7$ falls, said detection voltage $e_7$ is lower than the peak position of the triangular wave voltage $e_6$ produced by the integration circuit 36 as shown in FIG. 7($e$) and said triangular wave voltage $e_6$ exceeds the detection voltage $e_7$ in the $\Delta t$ range of the flyback time. FIG. 7($e$) shows an example case where the detection voltage $e_7$ detected in the flyback time of $t_4 \sim t_7$ is lower than the detection voltage $e_7$ detected in the flyback time of $t_0 \sim t_3$, and the $\Delta t$ range, that is, the range of zero voltage of the control voltage $e_8$ to be output from the comparison amplifier 22 will be larger as the detection voltage $e_7$, that is, the output voltage $E_H$ falls. (FIG. 7($f$)). The following describes the circuit operation when the control signal $e_8$ is supplied to the switching circuit 23, referring to the equivalent circuits shown in FIGS. 8 to 10 partly extracted from the circuit shown in FIG. 6.

Figure 8:
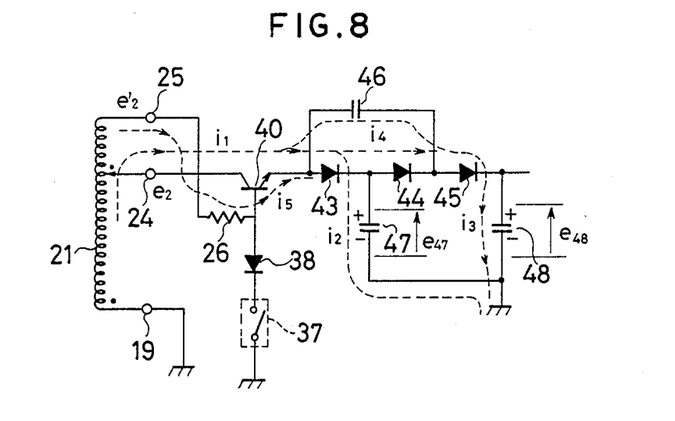

Since a zero voltage is supplied to the base of the drive transistor 37 in the flyback time of $t_1 \sim t_2$, said transistor 37 turns off. On the other hand, the voltage $e'_2$ which appears at the second output tap 25 of the additive voltage generating coil 21 is supplied to the base of control transistor 40 through the resistor 26 and said transistor 40 turns on. Accordingly, as shown in FIG. 8, the current $i_1$ flows from the first output tap 24 of the additive voltage generating coil 21 through the control transistor 40 and said current $i_1$ is divided into the current $i_4$ which passes through the first capacitor 46, current $i_3$ which passes through the first diode 43, second diode 44, third diode 45 and third capacitor 48 in sequence and current $i_2$ flowing from the first diode 43 to the second capacitor 47. In this case, current $i_4$ is extremely small and therefore omitted in the following description.

With current $I_2$, a voltage as shown below $$e_{47} = (1/C_{47}) \int_{t_1}^{t_2} i_2 \, dt \tag{1}$$

is produced at the second capacitor 47. In this case, $C_{47}$ is the static capacitance of the second capacitor 47. Similarly, a voltage $e_{48}$ as shown below is produced at the third capacitor 48.

$$e_{48} = (1/C_{48}) \int_{t_2}^{t_1} i_3 \, dt \tag{2}$$

where, $C_{48}$ is the static capacitance of the third capacitor 38.

The polarities of these voltages $e_{47}$ and $e_{48}$ are as shown in the related drawing.

Figure 9:
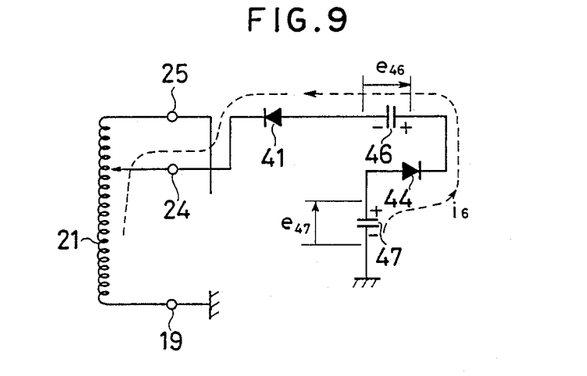

In the flyback time of $t_2 \sim t_5$, a positive voltage $e_8$ is supplied to the base of drive transistor 37, transistor 40 comes to have 0 V. Accordingly, said transistor 40 turns off. Since the voltage $e_2$ which appears at the first output tap 24 of the additive voltage generating coil 21 is negative for the scanning time of $t_3 \sim t_4$ in this period of time, the voltage of the second capacitor 47 becomes larger than the voltage of said first output tap 24. Accordingly, as shown in FIG. 9, the current $i_6$ flows from the second capacitor 47 toward the first output tap 24 and the voltage as shown below is provided at the first capacitor 46.

$$e_{46} = (1/C_{46}) \int i_6 \, dt \tag{3}$$

where, $C_{46}$ is the static capacitance of the first capacitor 46.

Figure 10:
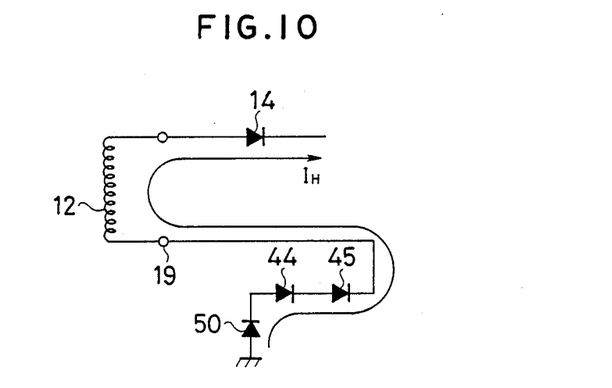

In the formula (3), time t is not shown because the starting and stopping timing of the current $i_6$, which begins to flow when the voltage $e_{47}$ of the second capacitor 47 becomes $e_2$ (equal to the voltage of the first output tap) and stops flowing when the voltage $e_{46}$ of the first capacitor 46 becomes $e_{46} = e_{47} + E_N$, varies with $\Delta t$ and is unstable. The output current $I_H$ when the control transistor turns off flows as shown in FIG. 10.

When the flyback time begins again, the control voltage becomes zero again, the drive transistor 37 turns off and the control transistor 40 turns on. Consequently, as shown in FIG. 6, the current $i_1$ flows from the first output tap 24 to the control transistor 40, and this current $i_1$ is divided into the current $i_4$ which passes through the first capacitor 46, third diode 45 and third capacitor 48 in sequence and the current $i_2$ flowing from the first diode 43 to the second capacitor 47.

Consequently, a voltage as shown below is charged in the third capacitor 48.

$$e_{48} = e_{46} + (1/C_{48}) \int_{t_1}^{t_2} i_4 \, dt \tag{4}$$

Subsequently, a similar cycle is repeated. If the $\Delta t$ time is fixed, the voltage $E_{48}$ which is charged in the third capacitor is as shown below $$e_{48} = 2 \left\{ (C1/C_{48}) \int_0^{\Delta t} i_2 \, dt + E_N \right\} \tag{5}$$

In this case, $E_N$ is the negative component of the waveform of voltage $e_2$ as shown in FIG. 7(h).

In the formula (5), the conditions of relationship as given below are satisfied.

When $\Delta t = 0$, $E_{48} = 2E_N$ \hfill (6)

$\Delta t = 0$ means that the detection voltage $e_7$ is equal to the peak value of triangular wave voltage $e_6$. In this case, the output volta $E_N$ does not fall and the current $I_H$ is zero.

When $\Delta t \div Tr$, $E_{48} = 2(E_2 + E_N)$ \hfill (7)

where, $E_2$ is the positive component of the waveform of voltage $e_2$ as shown in FIG. 7(h).

When $\Delta t$ coincides with the flyback time $Tr$ in FIG. 6, the first output voltage $e_2$ is doubled and supplied to the high voltage coil 12. The voltage multiplying rectifier circuit 42 functions as the voltage doubling circuit Generally, $E_2$ is approximately $10E_N$ and $E_N$ is nearly negligible. Thus, as $\Delta t$ varies from 0 to Tr, the voltage to be supplied to the high voltage coil 12 varies from 0 to $2E_2$ (actually, from $2E_{22}$ to $2(E_{22} + E_2)$), and the output voltage $E_H$ is fully controlled.

In the present invention, if the maximum load variation of output voltage $E_H$ is defined as $\Delta E_H$ and the voltage multiplying rectifier circuit 42 is adapted for n times, it is preferable that the condition given below is satisfied.

$$nE_2 \geq \Delta E_H \tag{8}$$

In this case, the voltage $E_2$ is as shown below.

$$E_2 = (1/n)\Delta E_H \tag{9}$$

The number of turns of winding of the additive voltage generating coil 21 should be determined so that said voltage $E_2$ is produced at the first output tap 24 of said coil 21. In the circuit shown in FIG. 6, since the voltage multiplying rectifier circuit 42 is adapted to the doubled voltage (n=2), the condition of $2E_2 \geq \Delta E_H$ is satisfied. The count of turns of winding of the coil 21 is determined to satisfy $E_2 = (\frac{1}{2})\Delta E_H$.

In some cases, it is necessary to supply an output current for circuit operation even when the output voltage $E_H$ becomes large beyond the range of compensation. In this embodiment, the object is achieved by providing the diode 50 in which the anode is connected to the ABL and the cathode is connected to the connection of the cathode of the first diode 43 and the anode of second diode 44.

Figure 11:
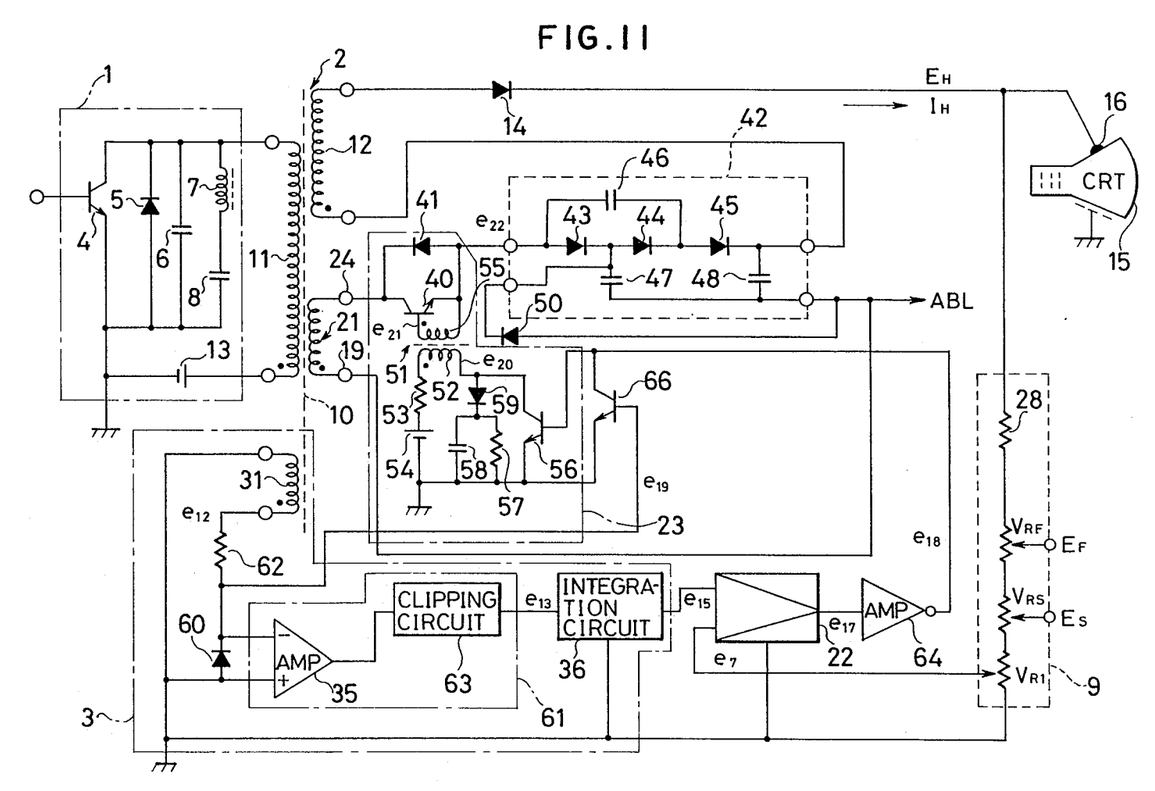
FIG. 11 is a circuit diagram showing another preferred embodiment of the apparatus according to the present invention.

FIG. 11 shows another preferred embodiment of the present invention. The same parts as those in FIG. 6 are given the same symbols and the description is omitted.

The reference voltage generating circuit 3 comprises the control voltage generating coil 31, rectifier 60, square wave output circuit 61, fixed resistor 62 and integration circuit 36. The square wave output circuit 61 comprises the amplifier 35 and the clipping circuit 63.

The control voltage generating coil 31 is mounted on the core 10 of flyback transformer 2 while being insulated from other coils and generates the control voltage $e_{12}$ of the flyback pulse waveform. The high potential side (winding end side) of this control voltage generating coil 31 is connected to the reference potential (grounding in the figure) and the low potential side (winding start side) of said coil 31 is connected to the minus terminal of the amplifier 35 through the fixed resistor 62. The plus terminal of the amplifier 35 is connected to the reference potential (grounding in the figure) and the diode 60 is connected between the plus terminal and the minus terminal of the amplifier 35 with the minus terminal connected to the cathode. If the input terminal of the amplifier 32 is formed by the base of the transistor, the diode 60 is unnecessary since the input waveform is rectified by the equivalent diode between the base and the emitter of that transistor.

Figure 12:
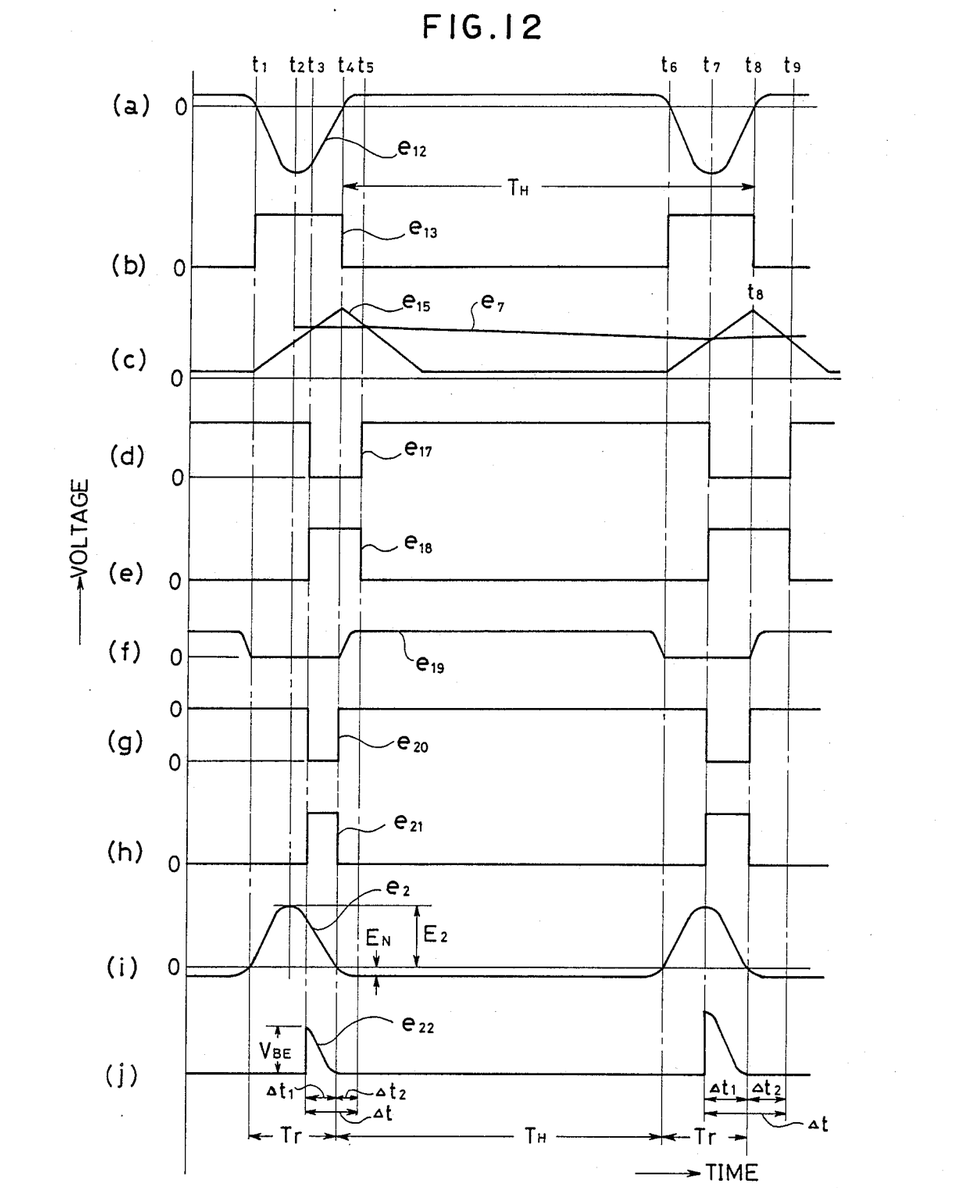
FIG. 12 is a waveform diagram of various parts of the circuit diagram shown in FIG. 11.

Said diode 60 rectifies the voltage $e_{12}$ produced at the control voltage generating coil 31 to cut off the negative component and inputs only the positive component of voltage $e_{12}$ to the inversion input terminal, that is, the minus terminal of the amplifier 35. The amplifier 35 amplifies this input voltage and the output obtained to the clipping circuit 63. The clipping circuit 63 clips the top portion of the voltage waveform amplified by said amplifier 35, produces the voltage $e_{13}$ of a square wave the pulse width of which is the flyback time Tr as shown in FIG. 12($b$) and supplies this voltage to the integration circuit 36. This integration circuit 36 integrates said square wave voltage $e_{13}$ over the period of flyback time Tr to generate a waveform which has the minimum value at the beginning point of the flyback time and the peak value at the end point of the flyback time and rises to the right side as shown in FIG. 12($c$). In this case, the integration is not carried out in the range exceeding the flyback time Tr and therefore the voltage $2_{15}$ of triangular wave (sawtooth waveform) which is declined from the peak point to the right side due to discharging from the capacitor of the integration circuit and peaked at the end point of flyback time Tr as a whole is produced. This triangular waveform of the voltage maintains a fixed shape in any flyback time Tr. This triangular wave voltage $e_{15}$ is supplied to the second input terminal of the comparison amplifier 22.

The comparison amplifier 22 compares the triangular wave voltage $e_{15}$ and the detection voltage $e_7$ supplied from the variable resistor $V_{R1}$ of said voltage detector 9 (FIG. 12($c$)) and supplies the control signal having the voltage which is a zero voltage only for the $\Delta t$ range ($t_3 \sim t_5$ range and $t_7 \sim t_9$ range in the figure) where the triangular wave voltage $e_{15}$ exceeds the detection voltage $e_7$ and a positive voltage of a fixed level in the other time range including the scanning time to the inversion amplifier 64. And the output signal $e_{18}$ whose positive and negative polarities are inverted by the inversion amplifier 64 is supplied to the switching circuit 23.

The switching circuit 23 comprises a drive transistor 56, a drive transformer 51 and a control transistor 40. The base drive transistor 56 is connected to the output terminal of inversion amplifier 64 and the emitter of said transistor 56 is connected to the reference potential line as well as one-side terminals of the resistor 57 and the capacitor 58 and the negative side of the drive power supply 54. Other terminal sides of said resistor 57 and said capacitor 58 are commonly connected to the cathode of diode 59 and the anode of said diode 59 is commonly connected to the collector of drive transistor 56 and the high potential side (winding end side) of the primary coil 52 which forms the drive transformer 51. These resistor 57, capacitor 58 and diode 59 form the snapper circuit. The low potential side (winding start side) is connected to the positive side of the drive power supply through the resistor 54.

Meanwhile, the low potential side (winding start side) of the secondary coil 55 of the drive transformer 51 is connected to the base of the control transistor 40 and the high potential side (winding end side) of said coil 55 is commonly connected to the emitter of control transistor 40 and the anode of diode 41. The emitter of said transistor 40 serves as the output terminal of the switching circuit 23 and is connected to the input terminal of the voltage multiplying rectifier circuit 42. The collector of the control transistor 40 and the cathode of diode 41 are connected to the output tap 24 of the additive voltage generating coil 21. The low potential side of the additive voltage generating coil 21 is connected to the ABL through the input tape 19.

This switching circuit 23 supplies the pulse voltage $e_{22}$ shown in FIG. 12($j$) to the voltage multiplying rectifier circuit 40 when the control signal $e_{17}$ has a zero voltage, in other words, the output signal $e_{18}$ from the inversion amplifier 64 has a positive voltage.

The transistor 66 serving as the switching control circuit is connected to the input terminal of the switching circuit 23. The base of transistor 66 is connected to the negative input terminal of said amplifier 35 and the emitter of said transistor 66 is connected to the emitter of drive transistor 56, and the collector of transistor 66 is connected to the base of drive transistor 56.

The following describes the operation of the switching circuit. Since the detection voltage $e_7$ is larger than the triangular wave voltage $e_{15}$ in the time $t_1 \sim t_3$ of the flyback time Tr even though the detection voltage $e_7$ is smaller than the peak value of triangular wave voltage $e_{15}$, the inversion amplifier 64 applies the zero voltage $e_{18}$ to the base of drive transistor 56. Consequently, said drive transistor 56 is turned off and the collector voltage $e_{20}$ of drive transistor 56 (FIG. 12($g$)) becomes a positive voltage. Accordingly, a sufficient amount of current does not flow from the drive power supply 54 to the primary coil 52 of the drive transformer 51, and the base voltage $e_{21}$ of the control transistor 40 (FIG. 12($h$)) comes to have a low potential and therefore the control transistor 40 is turned off. Accordingly, the additive voltage $e_{22}$ is supplied from the additive voltage generating coil 21 to the voltage multiplying rectifier circuit 42. (FIG. 12($j$))

Since the detection voltage $e_7$ is smaller than the triangular wave voltage $e_{15}$ in the time $t_3 \sim t_4$ of the flyback time Tr, the waveform of control signal $e_{17}$ falls at $t_3$ to have a zero voltage and accordingly the inversion amplifier 64 supplies the positive voltage $e_{18}$ to the base of the drive transistor 56. Consequently, said drive transistor 56 turns on and the current flows from the drive power supply 54 to the primary coil 52. A positive pulse $e_{21}$ is supplied to the base of control transistor 40 through the secondary coil 55 and said control transistor 40 turns on. In this case, a flyback pulse $e_2$ of approximately 1000 V (FIG. 12($i$)) is generated at the output terminal of the additive voltage generating coil 21 and this additive voltage $e_2$ is applied from the output tap 24 to the collector of the control transistor 40.

Accordingly, the transistor 40 turns on in the time $t_3 \sim t_4$ ($\Delta t_1$ time) and the waveform component $e_{22}$ of additive voltage $e_2$ in that period of time (FIG. 12(j)) is applied from the emitter of said control transistor 40 to the voltage multiplying rectifier circuit 42.

In the time $t_4 \sim t_5$, the control signal of $e_{15} > e_7$ is established as in case of said range $t_3 \sim t_4$. However, the time $t_4 \sim t_5$ is included in the scanning time and therefore the transistor 66 turns on, a negative voltage component $E_N$ of additive voltage $e_2$ is applied to the collector of control transistor 40 and said control transistor 40 turns off. Accordingly the voltage $e_{22}$ applied from the emitter of transistor 40 to the voltage multiplying rectifier circuit 42 becomes zero.

In the time $t_5 \sim t_6$, the relationship of $e_7 > e_{15}$ is obtained, the drive transistor 56 and the control transistor 40 are turned off and the voltage $e_{22}$ applied to the voltage multiplying rectifier circuit 42 becomes zero.

As described above, when the detection voltage $e_7$ is between the minimum voltage and the peak value voltage of triangular wave voltage $e_{15}$, the switching circuit 23 operates only for $\Delta t$ time to apply the additive voltage $e_{22}$ to the voltage multiplying rectifier circuit 42. In this case, the duration of $\Delta t_1$ time becomes longer and the operation time of the circuit 23 becomes longer as the output voltage $E_N$ becomes lower, and accordingly, the voltage $e_{22}$ applied to the voltage multiplying rectifier circuit 42 becomes larger.

When the detection voltage $e_7$ is equal to or larger than the peak value of triangular wave voltage $e_{15}$, in other words, the output voltage $E_N$ does not fall, the triangular wave of voltage $e_{15}$ and the waveform of voltage $e_7$ do not intersect each other and therefore a pulse of control signal $e_{17}$ is not generated and said signal $e_{17}$ shows a positive fixed level voltage over the flyback time Tr to the scanning time $T_H$.

Consequently, the output voltage $e_{18}$ from the inversion amplifier 64 becomes zero and the drive transistor 56 and the control transistor 40 are turned off and the additive voltage $e_{22}$ is not applied to the voltage multiplying rectifier circuit 42.

When the detection voltage $e_7$ is lower than the minimum voltage of the triangular wave of the triangular wave voltage $e_{15}$, the control signal $e_{17}$ comes to have a zero voltage over the overall period of the flyback time and the scanning time. On the other hand, the voltage $e_{19}$ is as shown in FIG. 12(f) and therefore the transistor 66 is turned off in the flyback time Tr and the peak value component $E_2$ of flyback pulse $e_2$ is applied to the voltage multiplying rectifier circuit 42.

The operation of the transistor 40 of the switching circuit 23 is automatically turned off since the collector voltage becomes a negative volta $E_N$ when the scanning time starts even if the voltage $e_{21}$ is supplied to the base of said transistor 40.

Figure 13:
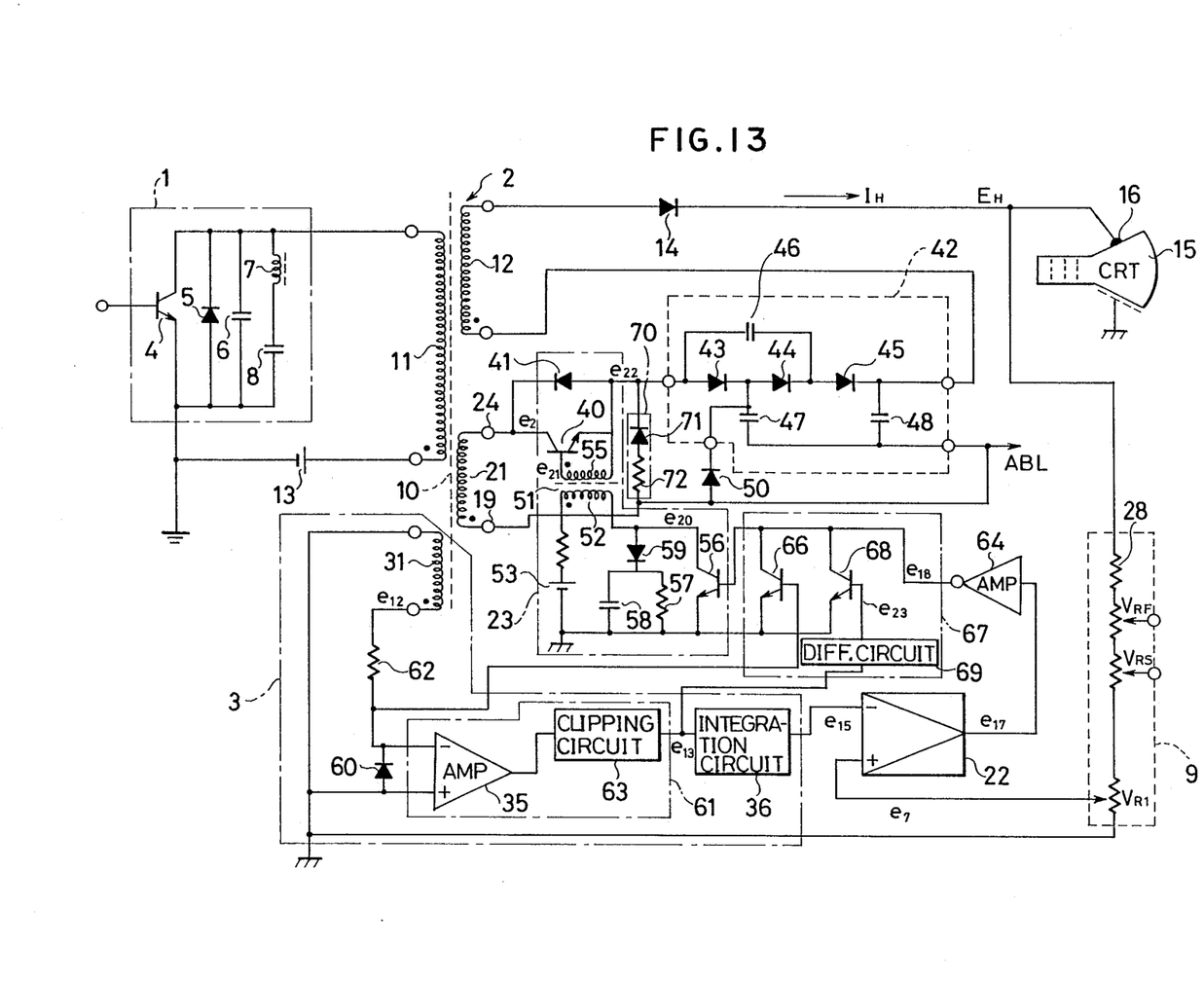
FIG. 13 is a circuit diagram showing another further preferred embodiment of the apparatus in accordance with the present invention.

FIG. 13 shows a further preferred embodiment obtained by improving the embodiment shown in FIG. 11. Accordingly, the same parts as those shown in FIGS. 6 and 11 are given the same symbols and the description is omitted.

The switching control circuit 67 comprises the first transistor 66, second transistor 68 and differentiation circuit 69. The collectors of both transistors 66 and 68 are commonly connected to the base of said drive transistor 56 and the emitters of both transistors 66 and 68 are commonly connected to the emitter of said drive transistor 56. The base of the first transistor 66 is connected to the negative input terminal of said amplifier 35 and the base of the second transistor 68 is connected to the output end of the clipping circuit 63 through the differentiation circuit 69.

The discharging circuit 70 comprises the diode 71 and the resistor 72. One end of resistor 72 is connected to the low potential terminal 19 of the additive voltage generating coil 21 and the other terminal is connected to the anode of diode 71. The cathode of diode 71 is connected to the emitter of control transistor 40.

The following describes the operation of the control transistor 40 when the transistor 68 of switching control circuit 67 operates.

Figure 14:
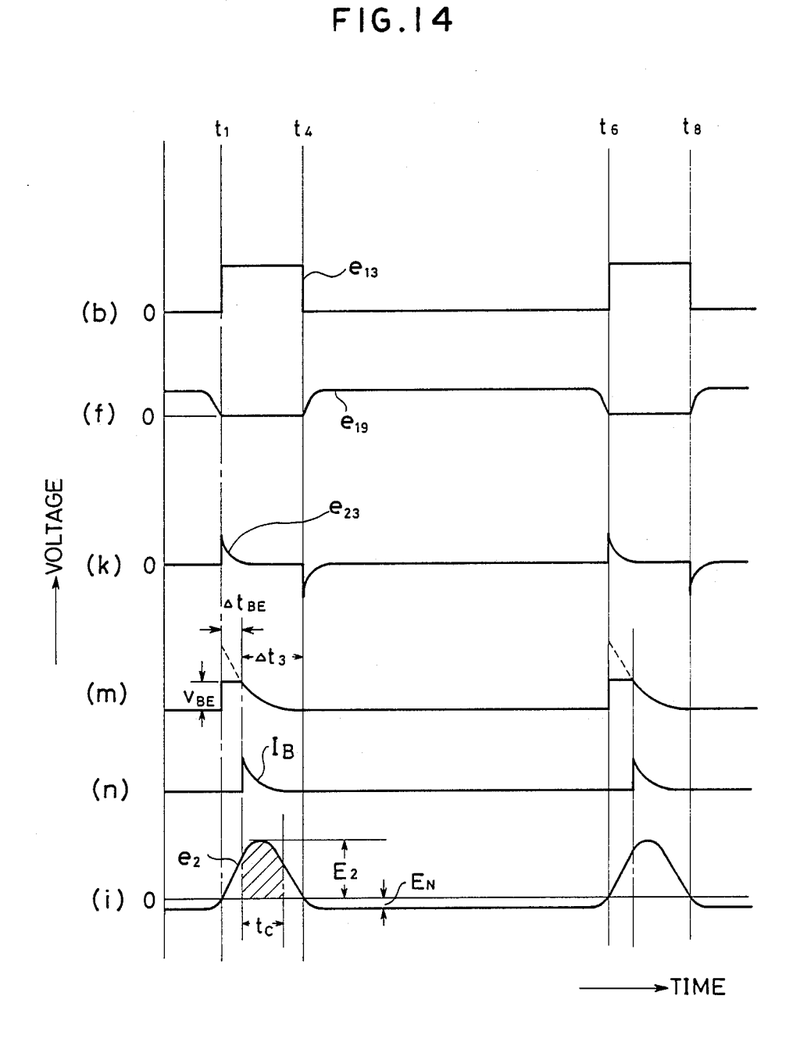
FIG. 14 is a waveform diagram of various parts of the circuit diagram shown in FIG. 13.

The differentiation circuit 69 differentiates the output voltage $e_{13}$ from the clipping circuit 63 and applies the differential output $e_{23}$ shown in FIG. 14(k) to the base of the second transistor 68.

The second transistor 68 turns on when the voltage $e_{23}$ exceeds the operating voltage $V_{BE}$ between the base and the emitter as shown in FIG. 14(m). This ON time is the time from the beginning of the flyback time Tr to $\Delta t_{BE}$. When the transistor 56 turns on, the drive transistor 56 is turned off and the control transistor 40 is turned off.

On the other hand, when the $\Delta t_{BE}$ time expires, the voltage $e_{23}$ falls below $E_{BE}$, the second transistor 68 is turned off, the drive transistor 56 turns on, the pulse current $I_B$ flows in the base of control transistor 40 (FIG. 14(n)), and said transistor 40 is turned on for a fixed time $t_c$. Consequently, the voltage of the hatched part of the additive voltage $e_2$ (FIG. 14(l)) corresponding to the time $t_c$ is supplied to the voltage multiplying rectifier circuit 42. Thus, if the control transistor 40 is turned on by shifting the rise timing $\Delta t_{BE}$ where the control transistor 40 is turned on, by the output voltage $e_{23}$ of the differentiation circuit 69, a large additive voltage $e_{22}$ can be supplied to the high voltage coil through the voltage multiplying rectifier circuit even when a common small drive transformer 51 is used and such problems as heat generation etc. resulting from increasing the capacity of said drive transformer 51 can be effectively solved.

In this case, the control transistor 40 is not kept on for the overall period of flyback time Tr and is kept off for the time during which the second transistor 68 is kept on and therefore the maximum time for which the control transistor 40 can be kept on is limited to $\Delta t_3$ shown in FIG. 14. Thus, by limiting the ON time of the control transistor 40, heat generation from the said transistor 40 and said drive transformer 51 can be reduced and power consumption can be saved, and an object for stabilizing the output voltage $E_H$ can be achieved by the drive transformer 51 of a smaller capacity.

The following describes the operation of the discharging circuit 70.

Generally, the control transistor 40 is turned off when the screen of the cathode-ray tube suddenly changes from a bright picture to a dark picture, in other words, the output current changes from an approximate maximum value to zero. When the control transistor 40 is turned off, electric charge on the second capacitor 47 and the third capacitor 48 of the voltage multiplying rectifier circuit 42 is immediately discharged through the high voltage coil 12 but the first capacitor 46 is charged with the anode of diode 45 to be plus in FIG. 14 and therefore a disadvantage that the discharging route for electric charge is closed occurs.

If the discharging route is thus closed, the first capacitor 46 remains charged with the maximum voltage and the sum of the maximum charged voltage and the additive voltage $e_2$ is applied to the control transistor 40 and a voltage larger than a reverse withstand voltage is applied to the control transistor 40 to result in a problem of breakage of said transistor 43.

The discharging circuit 60 is provided to prevent such problems. In other words, provision of this discharging circuit 60 allows quick discharging of electric charge on said first capacitor 46 through the route passing through the resistor 72, diode 71, first capacitor 46, and third diode 45 in sequence when the control transistor 40 is turned off.

The current flows in said discharging circuit 60 in both periods of the flyback time and the scanning time and the power loss at the resistor due to the flow of this current is somewhat a problem.

In the flyback time, however, even if the resistance value of the resistor 72 is set to 50 kΩ, the impedance of the voltage multiplying rectifier circuit 42 is more than 100MΩ when the control transistor 40 is turned off and, for this reason, the resistance value of resistor 72 is sufficiently smaller than the corresponding impedance and power consumption by the resistor 72 can be almost ignored On the other hand, the current flows through the diode 41 in the scanning time. In this case, when the peak value of additive voltage $e_2$ generated by the additive voltage generating coil 21 is approximately 1000 V, the negative voltage component $E_N$ of voltage $e_2$ is approximately 100 V and, when the resistance value of resistor 72 is 50 kΩ, the power loss at said resistor 72 is small as approximately 0.2 W which is negligible.

As described above, when output current $I_H$ flows and the output voltage $E_H$ falls, the additive voltage corresponding to the fall of the output voltage $E_H$ is supplied to the high voltage coil through the voltage multiplying rectifier circuit and a voltage corresponding to the fall of voltage is replenished to the high voltage coil and thus the output voltage is stabilized and the picture distortion can be prevented effectively.

The operation of the control transistor which replenishes the additive voltage to the high voltage coil is carried out in the flyback time of the horizontal deflection cycle and accordingly there is no fear of switching noise of the switching circuit which appears on the picture.

What is claimed is:

1. A high voltage generating apparatus for television equipment for supplying high voltage to an anode of a cathode-ray tube, comprising:
   (a) A flyback transformer which is provided with a low voltage coil and a high voltage coil in a magnetic core, boosts a flyback pulse to be supplied to said low voltage coil and generates a high voltage;
   (b) an additive voltage generating coil which is mounted on said magnetic core to generate an additive voltage;
   (c) a square wave generating means for generating a square wave voltage in a flyback time of a horizontal deflection cycle, said square wave generating means including a square wave output circuit receiving an input from a control voltage generating coil mounted on said magnetic core;
   (d) ramp circuit means receiving the output of said square wave output circuit for converting the square wave voltage into an inclined voltage;
   (e) A voltage detector which detects a mode of an output voltage of said high voltage coil which is rectified;
   (f) a comparison circuit means for comparing the inclined voltage from said ramp circuit means and a detection voltage from said voltage detector and for outputting a control signal with a pulse width referred to a time when said inclined voltage is larger than a detection voltage;
   (g) a switching circuit which has a drive transistor which operates with said control signal and a control transistor which operates resulting from the operation of said drive transistor and outputs an additive voltage of said additive voltage generating coil; and
   (h) an Nth (N is an integer larger than 1) voltage multiplying rectifier circuit receiving an input from said switching circuit and providing a rectified additive voltage to said high voltage coil.

2. A high voltage generating apparatus for television equipment in accordance with claim 1, wherein said ramp circuit means comprises an integration circuit which integrates the square wave voltage.

3. A high voltage generating apparatus for television equipment in accordance with claim 2, wherein said square wave output circuit comprises an amplifier and a clipping circuit.

4. A high voltage generating apparatus for television equipment in accordance with claim 2, wherein a series circuit of a capacitor and a resistor is connected between both terminals of a control voltage generating coil to form an oscillation circuit.

5. A high voltage generating apparatus for television equipment in accordance with claim 2, wherein said control voltage generating coil is provided with a rectifier for rectifying a control voltage generated from said control voltage generating coil.

6. A high voltage generating apparatus for television equipment in accordance with claim 2, wherein said square wave output circuit outputs a square pulse with a pulse width substantially equal to the flyback time and said integration circuit integrates said pulse for said flyback time.

7. A high voltage generating apparatus for television equipment in accordance with claim 1, wherein said switching circuit comprises a drive transistor the emitter of which is connected to a reference voltage terminal and the base of which is connected to an output terminal of said comparison amplifier and a control transistor the collector of which is connected to said additive voltage generating coil, the emitter of which is connected to an input terminal of said voltage multiplying rectifier circuit, and the base of which is connected to the collector of said drive transistor through a bias circuit.

8. A high voltage generating apparatus for television equipment to supply a high voltage to an anode of a cathode ray tube, comprising:
   (a) A flyback transformer which is provided with a low voltage coil, a high voltage coil and a magnetic core;
   (b) an additive voltage generating coil which is mounted on said magnetic core to generate an additive voltage;
   (c) means for generating a square wave voltage in a flyback time of a horizontal deflection cycle, said means including a square wave output circuit and a control voltage generating coil which mounted on said magnetic core;
   (d) circuit means for generating an inclined voltage based on said square wave voltage;

(e) a voltage detector for detecting said high voltage supplied to the anode of the cathode-ray tube;

(f) a comparison circuit which compares said inclined voltage from said circuit means and a detection voltage of said voltage detector and outputs a control signal with a pulse width refereed to a time when said inclined voltage is larger than a detection voltage;

(g) a switching circuit which has a drive transistor which operates with said control signal and a control transistor which operates with said control signal and a control transistor which operates resulting from the operation of said drive transistor and outputs the additive voltage of said additive voltage generating coil;

(h) a switching control circuit which controls the operation time of said switching circuit, and (i) an N-th (N is an integer larger than 1) voltage multiplying rectifier circuit which is connected in series to said high voltage coil and said switching circuit, thereby said additive voltage rectified.

9. A high voltage generating apparatus for television equipment in accordance with claim 8, wherein said square wave output circuit comprises an amplifier and a clipping circuit.

10. A high voltage generating apparatus for television equipment in accordance with claim 8, wherein said square wave output circuit outputs a square signal with a pulse width equal to the flyback time.

11. A high voltage generating apparatus for television equipment in accordance with claim 8, wherein said circuit means comprises an integration circuit which integrates the square signal.

12. A high voltage generating apparatus for television equipment in accordance with claim 8, wherein said switching control circuit is connected to an output terminal of the comparison circuit through an inversion amplifier.

13. A high voltage generating apparatus for television equipment in accordance with claim 17, wherein said discharging circuit is connected to an input terminal and a reference potential terminal of the voltage multiplying rectifier circuit.

14. A high voltage generating apparatus for television equipment in accordance with claim 8, wherein said switching circuit has a control transistor the collector side of which is connected to an output terminal of said additive voltage generating coil, a drive transistor operatively connected to the base of the control transistor for controlling a control signal to the base of said control transistor, and a drive transformer for regulating a drive output of said drive transistor and supplying said regulated output to said control transistor, a terminal of the primary coil of said drive transistor being connected to the collector of the drive transistor and the other terminal of said primary coil being connected to the emitter of the drive transistor through a drive power supply, and a terminal of the secondary coil of said drive transformer being connected to the emitter of the control transistor and the other terminal of said secondary coil being connected to the base of said control; transistor.

15. A high voltage generating apparatus for television equipment in accordance with claim 13, wherein said switching control circuit includes a transistor the collector of which is connected to the base of the drive transistor and the base of which is connected to a negative input terminal of the square wave output circuit.

16. A high voltage generating apparatus for television equipment in accordance with claim 13, wherein said switching control circuit includes a second transistor the collector of which is connected to the base of the drive transistor and the base of which is connected to an output terminal of the square wave output circuit through a differentiation circuit.

17. A high voltage generating apparatus for television equipment in accordance with claim 8 further comprising a discharging circuit for discharging an electric charge in the capacitor of the voltage multiplying rectifier circuit.

18. A high voltage generating apparatus for television equipment in accordance with claim 11, wherein said discharging circuit comprises a series circuit of a diode and a resistor.

* * * * *